United States Patent
Chen et al.

(10) Patent No.: US 8,009,598 B2
(45) Date of Patent: Aug. 30, 2011

(54) METHOD AND SYSTEM OF RADIO RESOURCE ALLOCATION FOR MOBILE MIMO-OFDMA

(75) Inventors: Kwang-Cheng Chen, Taipei (TW); Feng-Seng Chu, Zhonge (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 477 days.

(21) Appl. No.: 12/358,277

(22) Filed: Jan. 23, 2009

(65) Prior Publication Data
US 2009/0252101 A1 Oct. 8, 2009

(51) Int. Cl.
H04W 4/00 (2009.01)
H04B 7/00 (2006.01)
H04B 1/38 (2006.01)

(52) U.S. Cl. ....... 370/310; 370/328; 370/329; 455/13.4; 455/574

(58) Field of Classification Search .................. 370/328, 370/341, 329, 310, 311, 334, 338; 455/13.4, 455/574, 13, 63.1, 63.4, 65, 67.11, 67.13, 455/69, 78, 101, 103, 132, 277.1, 277.2, 455/323, 423, 452.2, 517, 522, 561, 562.1; 375/260
See application file for complete search history.

(56) References Cited

U.S. PATENT DOCUMENTS

| | | | |
|---|---|---|---|
| 7,260,153 B2 * | 8/2007 | Nissani (Nissensohn) | ... 375/259 |
| 2002/0111142 A1 * | 8/2002 | Klimovitch | ...... 455/63 |
| 2003/0003863 A1 * | 1/2003 | Thielecke et al. | .............. 455/39 |
| 2009/0252101 A1 * | 10/2009 | Chen et al. | ..................... 370/329 |

* cited by examiner

Primary Examiner — Kwang B Yao
Assistant Examiner — Adam Duda
(74) Attorney, Agent, or Firm — Ming Chow; Sinorica, LLC

(57) ABSTRACT

This patent discloses a method and a system of radio resource allocation for a mobile MIMO-OFDMA system, the method comprising the steps of: generating a diagonal matrix according to a channel matrix; determining a sum capacity function associated with the diagonal matrix, a plurality of transmission powers, and a plurality of subcarrier fractions; performing a first subcarrier fraction allocation by maximizing the sum capacity function according to a predetermined user capacity condition; performing a first transmission power allocation according to the first subcarrier allocation; and performing a second subcarrier fraction allocation by maximizing the sum capacity function according to the first transmission power allocation and the predetermined user capacity condition.

14 Claims, 2 Drawing Sheets

METHOD AND SYSTEM OF RADIO RESOURCE ALLOCATION FOR MOBILE MIMO-OFDMA

BACKGROUND OF THE INVENTION

1. Field of the Invention

The present invention relates to radio resource allocation, and more particularly to radio resource allocation on transmission power and subcarrier fraction for downlink mobile MIMO-OFDMA, in which the crucial mobile channel conditions are handled and the computation complexity is much reduced.

2. Description of the Related Art

In the next generation of wireless communication, due to the tremendous demand of various applications, the capability of supporting gigabit or higher data rate for nomadic users and hundreds of megabit data rate for users with high mobility is becoming a must, wherein said capacity demand of wireless communication can be met with the help of a properly allocation of the radio resource shared among the rated number of users of the MIMO-OFDMA communication system.

Orthogonal Frequency Division Multiple Access (OFDMA) is widely considered as the multiple access technology for state-of-the-art and future wireless communication due to its high-spectral efficiency and superior flexibility in radio resource allocation. Multiple Input Multiple Output (MIMO) technology can significantly improve the physical capacity of the wireless communication due to its multiple antennas structure. Therefore, the MIMO-OFDMA is becoming one of the key technologies for broadband mobile communication systems.

To fully utilize the capacity of the MIMO-OFDMA communication system, proper radio resource allocation is needed. Among the known arts, the OFDM-based round robin TDMA strategy is the typical one to the increase of the capacity of the MIMO-OFDMA communication system. However, if the computation complexity is taken into account, there is still some room for improvement on capacity versus computation complexity of the known technology mentioned above. We need a technology able to offer superior capacity with much less computation effort.

SUMMARY OF THE INVENTION

In view of the description above, an objective of the present invention is to provide an effective and robust method of radio resource allocation on transmission power and subcarrier fraction for downlink mobile MIMO-OFDMA communication, and still another objective of the present invention is to further provide a system capable of efficiently allocating the radio resource among the users for mobile MIMO-OFDMA communication in a reasonable amount of computations.

The present novel method and system of radio resource allocation, with a proposed channel equalization scheme and a resource allocation algorithm having linear complexity, can be utilized to greatly increase the capacity of the mobile MIMO-OFDMA communication.

A method of radio resource allocation is proposed accordingly for determining the transmission powers and subcarrier fractions for mobile stations in the downlink mobile MIMO-OFDMA system with a known channel matrix, a predetermined user capacity condition, and a plurality of default transmission powers, the method comprising the steps of: performing a matrix operation on the known channel matrix to generate a diagonal matrix; performing a first subcarrier fraction allocation by maximizing a sum capacity function according to the default transmission powers and the predetermined user capacity condition to allocate a plurality of first subcarrier fractions of the mobile stations; performing a first transmission power allocation according to the first subcarrier fractions of the mobile stations to allocate a plurality of first transmission powers of the mobile stations; and performing a second subcarrier fraction allocation by maximizing the sum capacity function according to the first transmission powers and the predetermined user capacity condition to allocate a plurality of second subcarrier fractions of the mobile stations, wherein the sum capacity function is associated with the diagonal matrix, the transmission powers, and the subcarrier fractions.

The proposed method of radio resource allocation on transmission power and subcarrier fraction for downlink mobile MIMO-OFDMA with known channel matrix of each of the mobile stations, capable of determining the transmission power and subcarrier fraction for each of the mobile stations to maximize the sum capacity of the mobile MIMO-OFDMA according to a diagonal matrix derived from the known channel matrix, and to an algorithm including a modified water-filling optimal power allocation scheme and a constraint linear programming of maximizing a sum capacity function, which represents the total capacity allocated to the mobile stations and is related to the subcarrier fraction, transmission power and the diagonal terms of the diagonal matrix, includes the steps of: performing an operation on the known channel matrix to generate a diagonal matrix; determining the transmission power according to a default allocation; determining a first subcarrier fraction allocation according to a constraint linear programming of maximizing the sum capacity function with the transmission power in the default allocation; determining a first power allocation according to the modified water-filling optimal power allocation scheme with the subcarriers allocated according to the first subcarrier fraction allocation; and determining a second subcarrier fraction allocation according to a constraint linear programming of maximizing the sum capacity function with the transmission power allocated according to the first power allocation.

Based on the method, the present invention further provides a novel system capable of efficiently and robustly allocating the radio resource of transmission power and subcarrier fraction for MIMO-OFDMA communication, which comprises: a matrix transformer for performing a matrix operation on the known channel matrix to generate a diagonal matrix; a first subcarrier fraction allocation unit for allocating a plurality of first subcarrier fractions of the mobile stations by maximizing a sum capacity function according to a set of predetermined transmission powers and a predetermined user capacity condition; a first transmission power allocation unit for allocating a plurality of first transmission powers of the mobile stations according to the first subcarrier fractions of the mobile stations; and a second subcarrier fraction allocation unit for allocating a plurality of second subcarrier fractions of the mobile stations by maximizing the sum capacity function according to the first transmission powers and the predetermined user capacity condition; wherein the sum capacity function is associated with the diagonal matrix, the transmission powers, and the subcarrier fractions.

The proposed system of the present invention of radio resource allocation on transmission power and subcarrier fraction for downlink mobile MIMO-OFDMA with known channel matrix of each of the mobile stations, capable of determining the transmission power and subcarrier fraction for each of the mobile stations to maximize the sum capacity of the mobile MIMO-OFDMA according to a diagonal matrix derived from the known channel matrix, and to an algorithm including a modified water-filling optimal power allocation scheme and a constraint linear programming of maximizing a sum capacity function, which represents the total capacity allocated to the mobile stations and is related to the subcarrier fraction, transmission power and the diagonal terms of the diagonal matrix, includes: a matrix transformer for performing an operation on the known channel matrix to generate a diagonal matrix; a first subcarrier fraction allocation unit for determining a first subcarrier fraction allocation according to a constraint linear programming of maximizing the sum capacity function with the transmission power in a default allocation; a first transmission power allocation unit for determining a first power allocation according to the modified water-filling optimal power allocation scheme with the subcarriers allocated according to the first subcarrier fraction allocation; and a second subcarrier fraction allocation unit for determining a second subcarrier fraction allocation according to a constraint linear programming of maximizing the sum capacity function with the transmission power allocated according to the first power allocation.

To make it easier to understand the objective of the invention, its structure, innovative features, and performance, we use a preferred embodiment together with the attached drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Throughout the description, we assume the number of antenna as N, the number of mobile stations as U, the number of symbols included in an OFDMA frame as T, and the number of subcarriers in each symbol as K.

Before describing the specific steps of the method of the present invention, the signal model of the system should be addressed first. In the invention, the time domain transmitted signal vector can be represented as $x=\Psi^H X$, the received signal vector of mobile station u can be represented as $r_u = D_u \Psi^H X + W_u$, and the demodulated signal vector can be represented as $Y_u = \Psi D_u \Psi^H X + \Psi w_u = \Omega_u X + W_u$, $\Omega_u = \Psi D_u \Psi^H$, where $D_u$ is the channel matrix, $\Psi^H$ is related to MIMO-OFDMA transmission scheme, $\Omega_u$ is called as equivalent channel matrix, and $\Psi$, $D_u$, $\Psi^H$ are all known factors. According to $\Omega_u$, on which some matrix operations can be performed, we can extract the information relating to signal to noise ratio for radio resource allocations thereafter.

Figure 1:
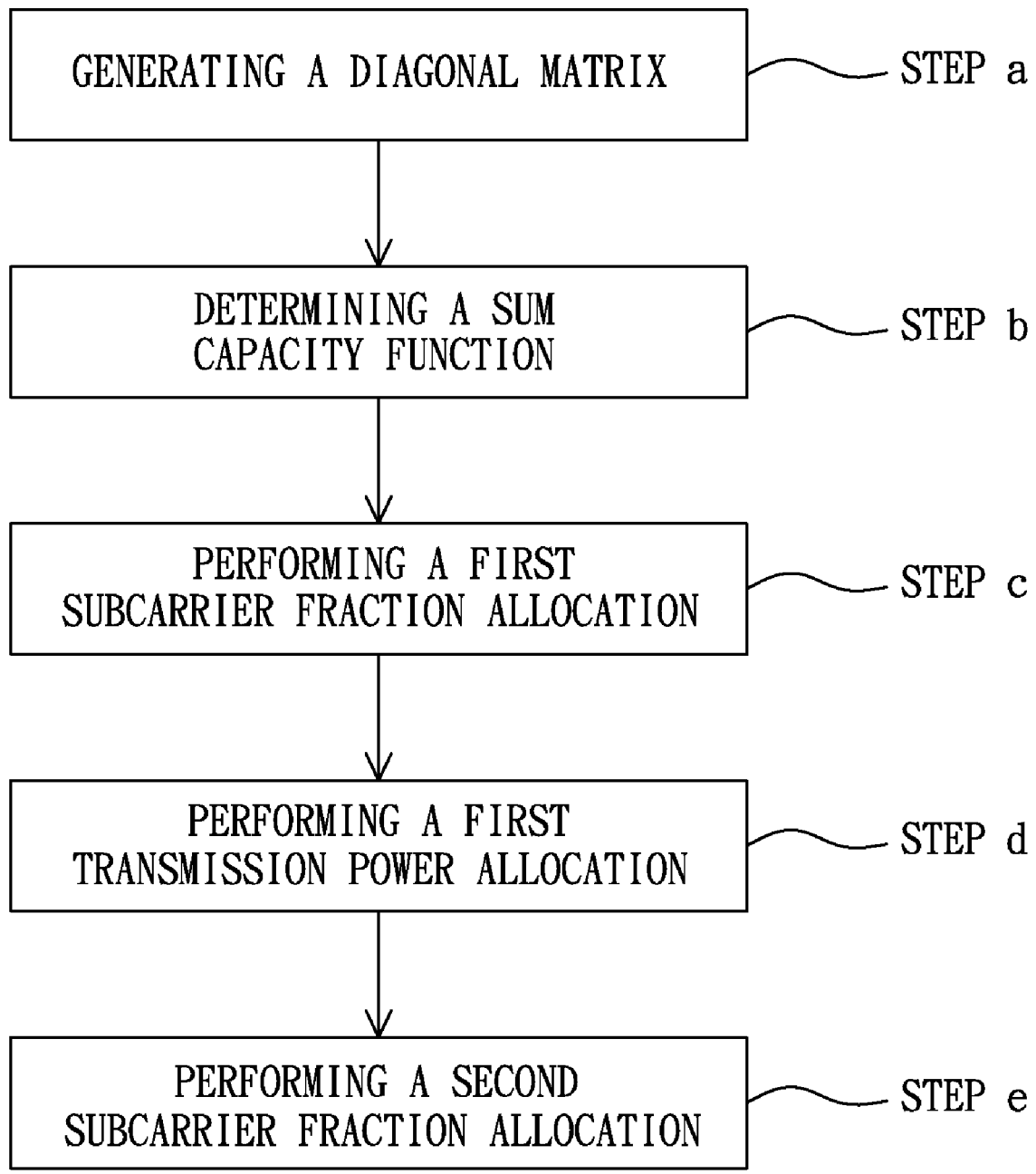
FIG. 1 is the flow chart of a preferred method of the present invention.

Please refer to FIG. 1, which shows the flow chart of the present resource allocation method. As shown in the FIG. 1, the method of a radio resource allocation on transmission power and subcarrier fraction for downlink mobile MIMO-OFDMA includes the steps of: generating a diagonal matrix (step a); determining a sum capacity function (step b); performing a first subcarrier fraction allocation (step c); performing a first transmission power allocation (step d); and performing a second subcarrier fraction allocation (step e).

In step a, a diagonal matrix is generated according to a matrix decomposition, for example but not limited to QR decomposition on the known channel matrix $\Omega_u$, which is used in the formulation of the demodulated signal vector as $Y_u = \Omega_u X + W_u$, where $Y_u$ is the demodulated signal vector, X is the transmitted signal vector, and $W_u$ is the additive noise vector, such that, $\Omega_u = Q_u R_u$ where $Q_u$ is an unitary matrix, $R_u$ is an upper triangular matrix and the diagonal terms of $R_u$ are equal to the diagonal terms of the diagonal matrix.

In step b, a sum capacity function $C_t(\omega_{u,\alpha,t,k}, P_{\alpha,t,k})$ is determined as, $C_t = \Sigma_u C_u$, u=0 to U−1, $C_u = \Sigma_\alpha \Sigma_t \Sigma_k \omega_{u,\alpha,t,k}$ log(1+ $SNR_{u,\alpha,t,k}$), $\alpha$=0 to N−1, t=0 to T−1, k=0 to K−1 and $SNR_{u,\alpha,t,k} = |r_{u,\alpha,t,k} P_{\alpha,t,k}|^2/(BN_0/K)$, where $C_t$ is the sum capacity, $C_u$ is the capacity allocated to mobile station u, $\omega_{u,\alpha,t,k}$ is the fraction of subcarrier k in symbol t on transmit antenna $\alpha$ assigned for mobile station u, $SNR_{u,\alpha,t,k}$ is the signal to noise ratio of subcarrier k in symbol t on transmit antenna $\alpha$ for mobile station u, $r_{u,\alpha,t,k}$ are the diagonal terms of the diagonal matrix, and $P_{\alpha,t,k}$ is the power allocated to subcarrier k in symbol t on antenna $\alpha$.

In step c, a first subcarrier fraction allocation is determined, according to a maximization of the sum capacity function with the default transmission power allocation, $C_t = MAX_{P_{\alpha,t,k} \omega_{u,\alpha,t,k}} \Sigma_u C_u$, u=0 to U−1, $C_u = \Sigma_\alpha \Sigma_t \Sigma_k \omega_{u,\alpha,t,k}$ log(1+ $SNR_{u,\alpha,t,k}$), $\alpha$=0 to N−1, t=0 to T−1, k=0 to K−1, and $SNR_{u,\alpha,t,k} = |r_{u,\alpha,t,k} P_{\alpha,t,k}|^2/(BN_0/K)$, where $C_t$ is the sum capacity, $C_u$ is the capacity allocated to mobile station u, $\omega_{u,\alpha,t,k}$ is the first subcarrier fraction of subcarrier k in symbol t on transmit antenna $\alpha$ assigned for mobile station u, $SNR_{u,\alpha,t,k}$ is the signal to noise ratio of subcarrier k in symbol t on transmit antenna $\alpha$ for mobile station u, $r_{u,\alpha,t,k}$ are the diagonal terms of the diagonal matrix, and $P_{\alpha,t,k}$ is the default transmission power allocated to subcarrier k in symbol t on antenna $\alpha$. The solution concerned in this maximization can be but not limited to a constraint linear programming with a total power constraint $\Sigma_\alpha \Sigma_t \Sigma_k P_{\alpha,t,k} \leq P_T$, $\alpha$=0 to N−1, t=0 to T−1, k=0 to K−1, where $P_T$ is the total transmission power, a fraction constraint $\Sigma_u \omega_{u,\alpha,t,k} \leq 1$, u=0 to U−1, for all $\alpha$, t, k, where $\omega_{u,\alpha,t,k}$ is the fraction of subcarrier k in symbol t on transmit antenna $\alpha$ assigned for mobile station u, and a fairness constraint $C_u/C_t = \gamma_u$, wherein $C_u$ is the capacity allocated to mobile station u and $\gamma_u$ is a corresponding fairness parameter configured by the designers.

In step d, a first transmission power allocation is determined according to a modified water-filling optimal power allocation scheme with the first subcarrier fraction allocation but without the fairness constraint
$P_{\alpha,t,k} = [P_T/NTK + (1/NTK)\Sigma_\alpha \Sigma_t \Sigma_k BN_0/K|r_{u^\wedge_{\alpha,t,s},\alpha,t,k}|^2 - BN_0/K|r_{u^{\alpha,t,k},\alpha,t,k}|^2]$, $\alpha$=0 to N−1, t=0 to T−1, k=0 to K−1, where $P_{\alpha,t,k}$ is the first transmission power allocated to subcarrier k in symbol t on antenna $\alpha$, $P_T$ is the total transmission power, $r_{u,\alpha,t,k}$ are the diagonal terms of the diagonal matrix, and $u^\wedge_{\alpha,t,s} = MAX_u \omega_{u,\alpha,t,s}$ for each subcarrier ($\alpha$,t,k).

In step e, a second subcarrier fraction allocation is determined according to a maximization of the sum capacity function with the transmission power arranged in the first allocation, $C_t = MAX_{P_{\alpha,t,k} \omega_{u,\alpha,t,k}} \Sigma_u C_u$, u=0 to U−1,
$C_u = \Sigma_\alpha \Sigma_t \Sigma_k \omega_{u,\alpha,t,k}$ log(1+$SNR_{u,\alpha,t,k}$), $\alpha$=0 to N−1, t=0 to T−1, k=0 to K−1, and $SNR_{u,\alpha,t,k} = |r_{u,\alpha,t,k} P_{\alpha,t,k}|^2/(BN_0/K)$, where $C_t$ is the sum capacity, $C_u$ is the capacity allocated to mobile station u, $\omega_{u,\alpha,t,k}$ is the second subcarrier fraction of subcarrier k in symbol t on transmit antenna $\alpha$ assigned for mobile station u, $SNR_{u,\alpha,t,k}$ is the signal to noise ratio of subcarrier k in symbol t on transmit antenna $\alpha$ for mobile station u, $r_{u,\alpha,t,k}$ are the diagonal terms of the diagonal matrix, and $P_{\alpha,t,k}$ is the first transmission power allocated to subcarrier k in symbol t on antenna $\alpha$. The solution concerned in this maximization can be but not limited to a constraint linear programming with a total power constraint $\Sigma_\alpha \Sigma_t \Sigma_k P_{\alpha,t,k} \leq P_T$, $\alpha=0$ to $N-1$, $t=0$ to $T-1$, $k=0$ to $K-1$, where $P_T$ is the total transmission power, a fraction constraint $\Sigma_u \omega_{u,\alpha,t,k} \leq 1$, $u=0$ to $U-1$, for all $\alpha$, $t$, $k$, where $\omega_{u,\alpha,t,k}$ is the fraction of subcarrier $k$ in symbol $t$ on transmit antenna $\alpha$ assigned for mobile station $u$, and a fairness constraint $C_u/C_t = \gamma_u$, wherein $C_u$ is the capacity allocated to mobile station $u$ and $\gamma_u$ are the fairness parameters configured by the designers.

Figure 2:
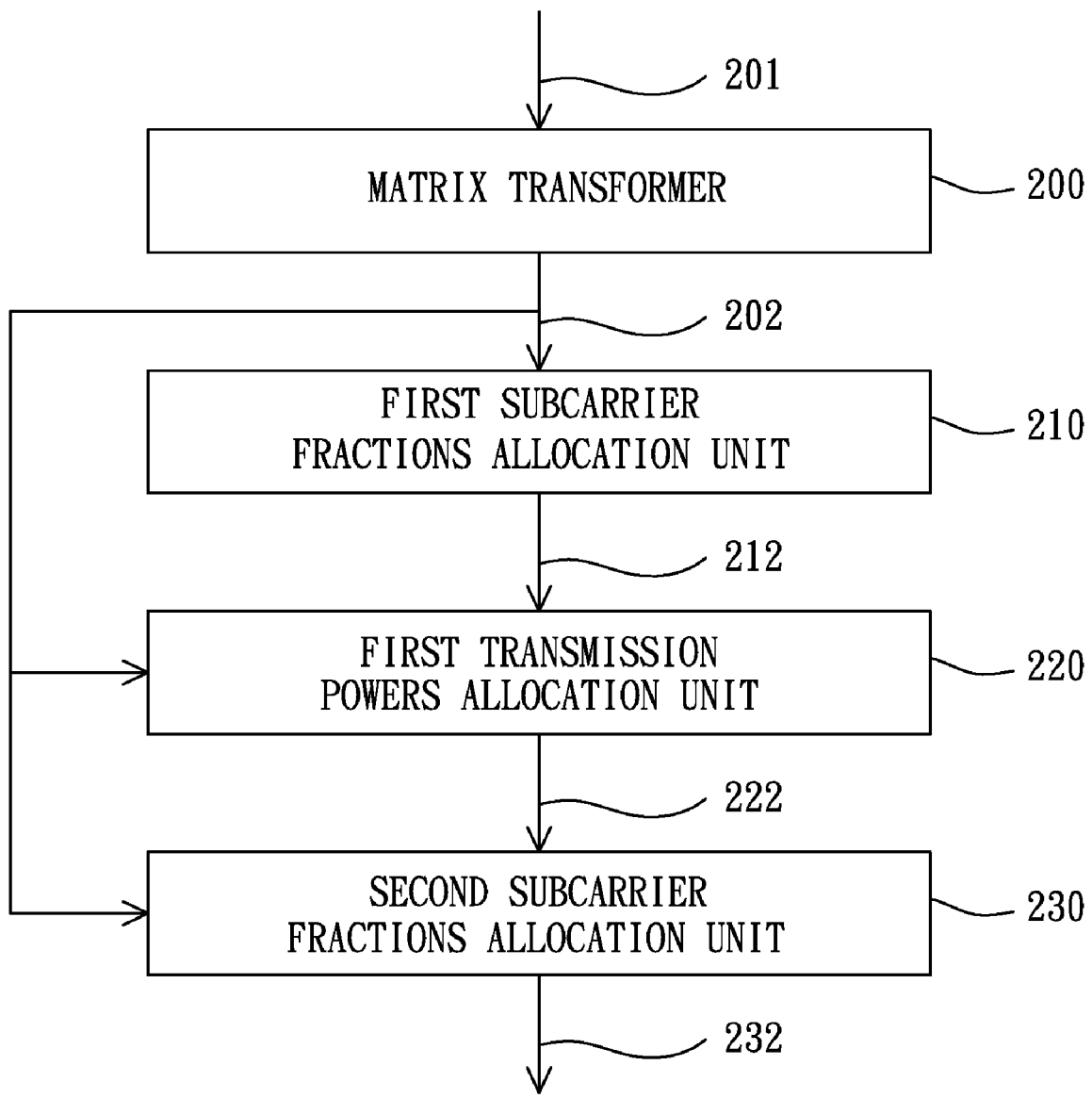
FIG. 2 is a block diagram of a preferred embodiment of the present invention.

Please refer to FIG. 2, which shows a block diagram of a system implementing the algorithm shown in FIG. 1. As shown in the FIG. 2, the system of a radio resource allocation on transmission power and subcarrier fraction for downlink mobile MIMO-OFDMA comprises: a matrix transformer 200, capable of generating a diagonal matrix 202 by performing an operation on the known channel matrix 201; a first subcarrier fractions allocation unit 210, capable of generating a first subcarrier fraction allocation 212 according to the diagonal matrix 202; a first transmission powers allocation unit 220, capable of generating a first transmission power allocation 222 according to the first subcarrier fraction allocation 212 and the diagonal matrix 202; and a second subcarrier fractions allocation unit 230, capable of generating a second subcarrier fraction allocation 232 according to the diagonal matrix 202 and the first transmission power allocation 222.

In the matrix transformer 200, a diagonal matrix 202 can be generated according to a QR decomposition, and the inter-antenna interference and inter-carrier interference can be eliminated through this operation.

In the first subcarrier fractions allocation unit 210, a first subcarrier fraction allocation 212 is generated according to a maximization of the sum capacity function with the default transmission power allocation $C_t = MAX_{P_{\alpha,t,k}, \omega_{u,\alpha,t,k}} \Sigma_u C_u$, $u=0$ to $U-1$,
$C_u = \Sigma_\alpha \Sigma_t \Sigma_k \omega_{u,\alpha,t,k} \log(1+SNR_{u,\alpha,t,k})$, $\alpha=0$ to $N-1$, $t=0$ to $T-1$, $k=0$ to $K-1$, and $SNR_{u,\alpha,t,k} = |r_{u,\alpha,t,k} P_{\alpha,t,k}|^2/(BN_O/K)$, where $C_t$ is the sum capacity, $C_u$ is the capacity allocated to mobile station $u$, $\omega_{u,\alpha,t,k}$ is the first subcarrier fraction 212 of subcarrier $k$ in symbol $t$ on transmit antenna $\alpha$ assigned for mobile station $u$, $SNR_{u,\alpha,t,k}$ is the signal to noise ratio of subcarrier $k$ in symbol $t$ on transmit antenna $\alpha$ for mobile station $u$, $r_{u,\alpha,t,k}$ are the diagonal terms of the diagonal matrix 202, and $P_{\alpha,t,k}$ is the default transmission power allocated to subcarrier $k$ in symbol $t$ on antenna $\alpha$. The solution concerned in this maximization can be but not limited to a constraint linear programming with a total power constraint $\Sigma_\alpha \Sigma_t \Sigma_k P_{\alpha,t,k} \leq P_T$, $\alpha=0$ to $N-1$, $t=0$ to $T-1$, $k=0$ to $K-1$, where $P_T$ is the total transmission power, a fraction constraint $\Sigma_u \omega_{u,\alpha,t,k} \leq 1$, $u=0$ to $U-1$, for all $\alpha$, $t$, $k$, where $\omega_{u,\alpha,t,k}$ is the fraction of subcarrier $k$ in symbol $t$ on transmit antenna $\alpha$ assigned for mobile station $u$, and a fairness constraint $C_u/C_t = \gamma_u$, wherein $C_u$ is the capacity allocated to mobile station $u$ and $\gamma_u$ are the fairness parameters configured by the designers.

In the first transmission powers allocation unit 220, a first transmission power allocation 222 is generated according to a modified water-filling optimal power allocation scheme with the first subcarrier fraction allocation 212 but without the fairness constraint
$P_{\alpha,t,k} = [P_T/NTK + (1/NTK)\Sigma_\alpha \Sigma_t \Sigma_k BN_O/K|r_{u^\wedge_{n,t,s},\alpha,t,k}|^2 - BN_O/K|r_{u^{\alpha,t,k},\alpha,t,k}|^2]$, $\alpha=0$ to $N-1$, $t=0$ to $T-1$, $k=0$ to $K-1$, where $P_{\alpha,t,k}$ is the first transmission power 222 allocated to subcarrier $k$ in symbol $t$ on antenna $\alpha$, $P_T$ is the total transmission power, $r_{u,\alpha,t,k}$ are the diagonal terms of the diagonal matrix 202, and $_{u^\wedge\alpha,t,s} = MAX_u \omega_{u,\alpha,t,s}$ for each subcarrier $(\alpha, t, k)$.

In the second subcarrier fractions allocation unit 230, a second subcarrier fraction allocation 232 is generated according to a maximization of the sum capacity function with the first transmission power allocation 222

$C_t = MAX_{P_{\alpha,t,k}, \omega_{u,\alpha,t,k}} \Sigma_u C_u$, $u=0$ to $U-1$,
$C_u = \Sigma_\alpha \Sigma_t \Sigma_k \omega_{u,\alpha,t,k} \log(1+SNR_{u,\alpha,t,k})$, $\alpha=0$ to $N-1$, $t=0$ to $T-1$, $k=0$ to $K-1$, and $SNR_{u,\alpha,t,k} = |r_{u,\alpha,t,k} P_{\alpha,t,k}|^2/(BN_O/K)$, where $C_t$ is the sum capacity, $C_u$ is the capacity allocated to mobile station $u$, $\omega_{u,\alpha,t,k}$ is the second subcarrier fraction 232 of subcarrier $k$ in symbol $t$ on transmit antenna $\alpha$ assigned for mobile station $u$, $SNR_{u,\alpha,t,k}$ is the signal to noise ratio of subcarrier $k$ in symbol $t$ on transmit antenna $\alpha$ for mobile station $u$, $r_{u,\alpha,t,k}$ are the diagonal terms of the diagonal matrix 202, and $P_{\alpha,t,k}$ is the first transmission power 222 allocated to subcarrier $k$ in symbol $t$ on antenna $\alpha$. The solution concerned in this maximization can be but not limited to a constraint linear programming with a total power constraint $\Sigma_\alpha \Sigma_t \Sigma_k P_{\alpha,t,k} \leq P_T$, $\alpha=0$ to $N-1$, $t=0$ to $T-1$, $k=0$ to $K-1$, where $P_T$ is the total transmission power, a fraction constraint $\Sigma_u \omega_{u,\alpha,t,k} \leq 1$, $u=0$ to $U-1$, for all $\alpha$, $t$, $k$, where $\omega_{u,\alpha,t,k}$ is the fraction of subcarrier $k$ in symbol $t$ on transmit antenna $\alpha$ assigned for mobile station $u$, and a fairness constraint $C_u/C_t = \gamma_u$, wherein $C_u$ is the capacity allocated to mobile station $u$ and $\gamma_u$ are the fairness parameters configured by the designers.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A method of radio resource allocation for determining the transmission powers and subcarrier fractions for mobile stations in a downlink mobile MIMO-OFDMA system with a channel matrix, a predetermined user capacity condition, and a plurality of default transmission powers, comprising the steps of:
    performing a matrix operation on said channel matrix to generate a diagonal matrix;
    performing a first subcarrier fraction allocation by maximizing a sum capacity function according to said default transmission powers and said predetermined user capacity condition to allocate a plurality of first subcarrier fractions of said mobile stations;
    performing a first transmission power allocation according to said first subcarrier fractions of said mobile stations to allocate a plurality of first transmission powers of said mobile stations; and
    performing a second subcarrier fraction allocation by maximizing said sum capacity function according to said first transmission powers and said predetermined user capacity condition to allocate a plurality of second subcarrier fractions of said mobile stations, wherein said sum capacity function is associated with said diagonal matrix, said transmission powers, and said subcarrier fractions.

2. The method as recited in claim 1, wherein said matrix operation is QR decomposition.

3. The method as recited in claim 1, wherein said sum capacity function is $MAX_{P_{\alpha,t,k},\omega_{u,\alpha,t,k}} \Sigma_u \Sigma_\alpha \Sigma_t \Sigma_k \omega_{u,\alpha,t,k} \log_2(1+f(r_{u,\alpha,\alpha,t,k} P_{\alpha,t,k}))$, u=0 to U−1, α=0 to N−1, t=0 to T−1, k=0 to K−1, wherein $\omega_{u,\alpha,t,k}$ is the subcarrier fraction of subcarrier k in symbol t on antenna α assigned for mobile station u, $r_{u,\alpha,\alpha,t,k}$ is a diagonal term of said diagonal matrix and $P_{\alpha,t,k}$ is the power allocated to subcarrier k in symbol t on antenna α.

4. The method as recited in claim 1, wherein said first transmission power allocation involves a power allocation scheme which is $P_{\alpha,t,k}=[P_T/NTK+(1/NTK)\Sigma_\alpha \Sigma_t \Sigma_k BN_O/K|r_{u^\wedge_{\alpha,t,s},\alpha,\alpha,t,k}|^2 - BN_O/K|r_{u^{\alpha,t,k},\alpha,\alpha,t,k}|^2]$, α=0 to N−1, t=0 to T−1, k=0 to K−1, wherein $P_{\alpha,t,k}$ is the power allocated to subcarrier k in symbol t on antenna α, $P_T$ is the total transmission power, $r_{u,\alpha,\alpha,t,k}$ is a diagonal term of said diagonal matrix, and $u^\wedge_{\alpha,t,s} = MAX_u \omega_{u,\alpha,t,s}$ for each subcarrier (α, t, k).

5. The method as recited in claim 1, wherein the step of performing a first transmission power allocation includes a total power constraint that the sum of said first transmission powers of each mobile station is less than or equal to a total power.

6. The method as recited in claim 1, wherein the step of performing a first subcarrier fraction allocation includes a subcarrier constraint that the sum of said first subcarrier fractions of each subcarrier are less than 1.

7. The method as recited in claim 1, wherein the step of performing a second subcarrier fraction allocation includes a subcarrier constraint that the sum of said second subcarrier fractions of each subcarrier is less than 1.

8. The method as recited in claim 1, wherein said predetermined user capacity condition is determined by a fairness constraint $C_u/C_t=\gamma_u$, wherein $C_u$ is a capacity function corresponding to a mobile station, $C_t$ is said sum capacity function and $\gamma_u$ is a fairness parameter corresponding to said mobile station.

9. A system of radio resource allocation for determining the transmission powers and subcarrier fractions for mobile stations in a downlink mobile MIMO-OFDMA system with a channel matrix, a predetermined user capacity condition, and a plurality of default transmission powers, comprising:
   a matrix transformer for performing a matrix operation on said channel matrix to generate a diagonal matrix;
   a first subcarrier fraction allocation unit for allocating a plurality of first subcarrier fractions of said mobile stations by maximizing a sum capacity function according to said predetermined transmission powers and said predetermined user capacity condition;
   a first transmission power allocation unit for allocating a plurality of first transmission powers of said mobile stations according to said first subcarrier fractions of said all mobile stations; and
   a second subcarrier fraction allocation unit for allocating a plurality of second subcarrier fractions of said mobile stations by maximizing said sum capacity function according to said first transmission powers and said predetermined user capacity condition, wherein said sum capacity function is associated with said diagonal matrix, said transmission powers, and said subcarrier fractions.

10. The system as recited in claim 9, wherein said matrix operation is QR decomposition.

11. The system as recited in claim 9, wherein said sum capacity function is $MAX_{P_{\alpha,t,k},\omega_{u,\alpha,t,k}} \Sigma_u \Sigma_\alpha \Sigma_t \Sigma_k \omega_{u,\alpha,t,k} \log_2(1+f(r_{u,\alpha,\alpha,t,k} P_{\alpha,t,k}))$, u=0 to U−1 α=0 to N−1, t=0 to T−1, k=0 to K−1, where $\omega_{u,\alpha,t,k}$ is the subcarrier fraction of subcarrier k in symbol t on antenna α assigned for mobile station u, $r_{u,\alpha,\alpha,t,k}$ is a diagonal term of said diagonal matrix and $P_{\alpha,t,k}$ is the power allocated to subcarrier k in symbol t on antenna α.

12. A system as recited in claim 9, wherein a first transmission power allocation unit comprises a power calculator performing a first transmission power function as $P_{\alpha,t,k}=[P_T/NTK+(1/NTK)\Sigma_\alpha \Sigma_t \Sigma_k BN_O/K|r_{u^\wedge_{\alpha,t,s},\alpha,\alpha,t,k}|^2 - BN_O/K|r_{u^{\alpha,t,k},\alpha,\alpha,t,k}|^2]$, α=0 to N−1, t=0 to T−1, k=0 to K−1, where $P_{\alpha,t,k}$ is the power allocated to subcarrier k in symbol t on antenna α, $P_T$ is the total transmission power, $r_{u,\alpha,\alpha,t,k}$ is a diagonal term of said diagonal matrix, and $u^\wedge_{\alpha,t,s}=MAX_u \omega_{u,\alpha,t,s}$ for each subcarrier (α, t, k).

13. The system as recited in claim 9, wherein the sum of said first transmission powers of each mobile station is less than or equal to a total power.

14. The system as recited in claim 9, wherein the sum of said first subcarrier fractions of each subcarrier is less than or equal to 1.

* * * * *